United States Patent [19]

Morimoto et al.

[11] Patent Number: 5,289,564
[45] Date of Patent: Feb. 22, 1994

[54] IMAGE RECORDING APPARATUS FOR PROVIDING HIGH QUALITY IMAGE

[75] Inventors: Keniti Morimoto, Nara; Satoshi Murakami, Yamato-Koriyama; Masahiko Aiba; Yuriko Kamei, both of Nara, all of Japan

[73] Assignee: Sharp Kabushiki Kaisha, Osaka, Japan

[21] Appl. No.: 797,732

[22] Filed: Nov. 25, 1991

[30] Foreign Application Priority Data

Nov. 26, 1990 [JP] Japan .................. 321710/90
Nov. 22, 1991 [JP] Japan .................. 307848/91

[51] Int. Cl.⁵ .................................. G06F 15/00
[52] U.S. Cl. ...................... 395/109; 395/101
[58] Field of Search ........... 395/101, 109, 110, 115, 395/116, 103; 358/450, 451, 462; 382/54, 55; 346/154

[56] References Cited

U.S. PATENT DOCUMENTS

| | | |
|---|---|---|
| 3,921,164 | 11/1975 | Anderson . |
| 4,129,860 | 12/1978 | Yonezana et al. . |
| 4,356,555 | 10/1982 | Ejiri et al. .................. 395/109 |
| 4,437,122 | 3/1984 | Walsh et al. . |
| 4,544,922 | 10/1985 | Watanabe . |
| 4,847,641 | 7/1989 | Tung . |
| 4,992,958 | 2/1991 | Kageyama .................. 395/116 |
| 5,005,139 | 4/1991 | Tung .................. 395/101 |

FOREIGN PATENT DOCUMENTS

| | | | |
|---|---|---|---|
| 0356224 | 2/1990 | European Pat. Off. ......... 385/109 |
| 0385508 | 5/1990 | European Pat. Off. ......... 395/109 |
| 0386995 | 12/1990 | European Pat. Off. ......... 395/109 |
| 4011758 | 10/1990 | Fed. Rep. of Germany . |
| 52-48929 | 4/1977 | Japan . |

OTHER PUBLICATIONS

European Search Report in Corresponding European Patent Application issued by European Patent Office on Feb. 3, 1993.

*Primary Examiner*—Arthur G. Evans
*Attorney, Agent, or Firm*—David G. Conlin; Henry D. Pahl, Jr.

[57] ABSTRACT

An image recording apparatus which is capable of recording an image by forming a dot for each pixel includes an interface (14) for receiving dot data having 300 dpi dot density, converting unit (15, 16, 17, 18) connected to the interface for converting the received data into dot data having 600 dpi dot density by replacing a dot of a focus pixel with a plurality of dots having patterns corresponding to dot patterns of areas containing the focus pixel, and a base engine unit (13) connected to the converting unit for forming an image in accordance with the converted dot data.

20 Claims, 14 Drawing Sheets

IMAGE RECORDING APPARATUS FOR PROVIDING HIGH QUALITY IMAGE

BACKGROUND OF THE INVENTION

1. Field of the Invention

The present invention relates to an image recording apparatus, such as a laser printer, which is capable of printing characters and symbols on paper at high quality with a low noise.

2. Description of the Related Art

In recent days, a laser printer is widely used as an output device of the computer because of producing a high quality image with a low noise.

The inventors of the present invention know a laser printer which is capable of printing an image at a resolution of 300 dpi and a pace of 10 sheets per minute. However, a laser printer which has 600 dpi or more resolution is requested by many users who desire to print more image in the same period of time.

In a case that a printer having a printing density of 600 dpi is used, dot data for a dot density (printing density) of 300 dpi is reduced to a half in a vertical and a horizontal directions of the dot data.

To avoid this reduction, it is necessary to double the number of dots in the vertical and the horizontal directions.

Meanwhile, the rugged contour of the character printed at 600 dpi is not improved as compared with the character printed at 300 dpi.

It is certain that the high-quality image is allowed to be printed by printing the dot data for the printing density of 600 dpi at the density of 600 dpi. However, for achieving this, a capacitance of the video memory is required to be four times larger than the known printer which is capable of printing an image at 300 dpi.

As a result, the laser printer becomes more costly, and the laser printer cannot be applied to the existing application programs developed for a computer designed to output the dot data for the printing density of 300 dpi to the printer, disadvantageously.

To overcome the above-mentioned disadvantages, the apparatus disclosed in U.S. Pat. No. 4,847,641 is capable of printing 300-dpi data at a printing density of 600 dpi as a pseudo image. In a case that the dot pattern of a character to be printed coincides with a pre-stored pattern, the disclosed apparatus serves to change a spot size of a light beam or slightly move the location of the dot in the main-scan direction (by ¼ dot, for example).

However, the disclosed apparatus serves to process a signal only in the main-scan direction, that is, the image quality is not enhanced in the sub-scan direction.

SUMMARY OF THE INVENTION

It is therefore an object of the present invention to provide an image recording apparatus which is capable of converting data corresponding to a low printing density into data corresponding to a high printing density for printing characters and symbols at high quality.

The object of the present invention can be achieved by an image recording apparatus which is capable of recording an image by forming a dot for each pixel includes a unit for receiving dot data having a first dot density, a unit connected to the receiving unit for converting the received data into dot data having a second dot density by replacing a dot of a focus pixel with a plurality of dots having patterns corresponding to dot patterns of areas containing the focus pixel, and a unit connected to the converting unit for forming an image in accordance with the converted dot data.

Preferably, the receiving unit is adapted to be connected to a host computer for receiving the dot data having the first dot density.

More preferably, the receiving unit is capable of receiving code data which is output from the host computer.

Further preferably, the first dot density of the dot data is 300 dpi.

The converting unit includes an interpreter section for decoding the dot data having the first dot density received by the receiving unit, preferably.

The interpreter section is preferably capable of decoding code data received by the receiving unit.

The converting unit further includes a storage section coupled with the interpreter section for storing font data, preferably.

The converting unit further includes a drawer section connected to both of the interpreter section and the storage section for generating drawing data by comparing data output from the interpreter section with the font data stored in the storage section, preferably.

The converting unit further includes a converting section for converting the data output from the drawer section into dot data having the second dot density, preferably.

Preferably, the second dot density is 600 dpi.

More preferably, converting section includes a plurality of line memories for storing data output from the draw section.

The converting section further includes a plurality of logic gates connected to the plurality of line memories, each of the logic gates being adapted to pass through the data output from the draw section, preferably.

The converting section further includes a selector connected to both of the plurality of logic gates and the plurality of line memories for transferring a content of one of the plurality of line memories to another one of the plurality of line memories sequentially, preferably.

The converting section further includes a pattern storage section for pre-storing a pattern, and a comparator connected to the plurality of line memories and the pattern storage section for comparing the dot pattern output from the plurality of line memories with the pattern pre-stored in the pattern storage section, preferably.

Further preferably, the converting section further includes a pattern generator connected to the comparator for converting the pattern of 300-dpi dot data into the pattern of 600-dpi dot data in accordance with a compared result by the comparator.

The converting section further includes a data selector connected to the pattern generator for dividing dot data of doubled line density at each line into an upper portion and a lower portion and outputs the dot data one by one, preferably.

The converting section further includes a control unit connected to both of the selector and the data selector for controlling the selector and the data selector.

Preferably, the forming unit includes an optical system having a photosensitive drum for forming a latent image corresponding to the data output from the converting unit on the photosensitive drum by scanning.

More preferably, the forming unit further includes a process system having a developing unit for fixing toner on the latent image for visualizing the latent image and a cleaning unit for removing residual toner.

The forming unit further includes a fixing system for fixing toner on a recording sheet, and a sheet feeding system for feeding the recording sheet, preferably.

The converting section includes a shift register for storing data output from the draw section, preferably.

The converting section further includes a selector circuit connected to the shift register for selecting a data to be transferred to the shift register, preferably.

The converting section further includes a judge circuit connected to the shift register for pre-storing a pattern, for comparing the dot pattern output from the shift register with the pattern pre-stored therein, and for converting the pattern of 300-dpi dot data into the pattern of 600-dpi dot data in accordance with a compared result, preferably.

Preferably, the converting section further includes an output buffer connected to the judge circuit for dividing dot data of doubled line density at each line into an upper portion and a lower portion and outputs the dot data one by one.

Further preferably, the converting section further includes a timing controller connected to both of the shift register and the output buffer for controlling the shift register and the output buffer so as to output a proper data.

More preferably, the converting section further includes a FIFO unit connected to the timing controller for storing data output from the timing controller.

In operation, when the dot data for a dot density of 300 dpi is input, a pixel area of a predetermined size, a type of the dot patterns in an area consisting of three lines X three columns are identified. Based on the identified result, one dot of a focus pixel located at the center of the area is replaced with four dots consisting of two rows X two columns. This replacement is executed for all pixels, resulting in being able to convert 300-dpi dot data into 600-dpi dot data.

As mentioned above, the image recording apparatus of the present invention serves to convert the dot of the focus pixel into two or more dots formed as the pattern matching to the dot pattern of the area containing the focus pixel. The conversion unit converts a low printing density dot data into a high printing density dot data.

Hence, advantageously, according to the present invention, a high quality of image is formed by a recording apparatus having a simple circuit arrangement.

Further objects and advantages of the present invention will be apparent from the following description of the preferred embodiments of the invention as illustrated in the accompanying drawings.

BRIEF DESCRIPTION OF THE DRAWINGS

FIGS. 14 to 17 are views showing logic formulas executed in the judge circuit of FIG. 9.

DESCRIPTION OF THE PREFERRED EMBODIMENTS

Referring to the accompanying drawings, an embodiment of image recording apparatus according to the present invention will be described in detail in the following parts.

Figure 1:
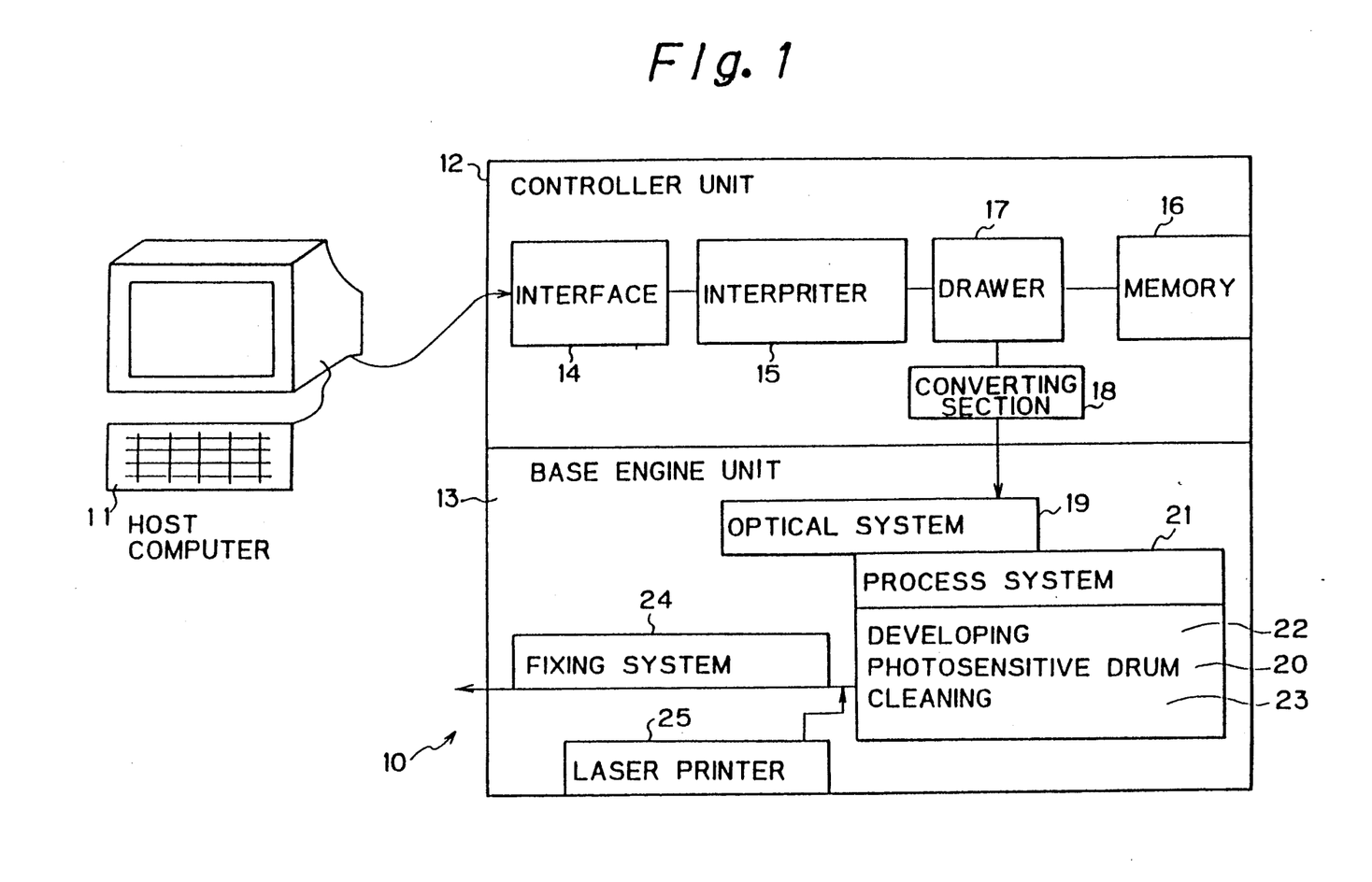
FIG. 1 is a block diagram showing schematic arrangement of a laser printer according to an embodiment of the present invention.

FIG. 1 shows a block diagrams of an image recording apparatus according to a first embodiment of the present invention.

A laser printer 10 is connected to a host computer 11 and includes a controller unit 12 for processing the data output from the host computer 11 and a base engine unit 13 for printing characters and symbols on a recording paper on the basis of the data processed by the controller unit 12.

The controller unit 12 is arranged to have an interface section 14 for reading 300 dpi (dot per inch) dot data or code data output from the host computer 11, an interpreter section 15 for decoding the input dot data and the code data, a memory 16 for storing font data, a drawer section 17 for generating drawing data by comparing the data output from the interpreter section 15 with the font data stored in the memory section 16, and a converting section 18 for converting the data output from the drawer section 17 into the data corresponding to the printing density of 600 dpi.

The base engine unit 13 is arranged to have an optical system 19 for forming a latent image corresponding to the data output from the controller unit 12 on a photosensitive drum 20 by the scanning of a laser beam, a process system 21 including a developing unit 22 for fixing toner on the latent image for visualizing the latent image and a cleaning unit 23 for removing residual toner, a fixing system 24 for fixing toner on a recording paper, and a paper feeding system 25 for feeding a recording paper.

Figure 2:
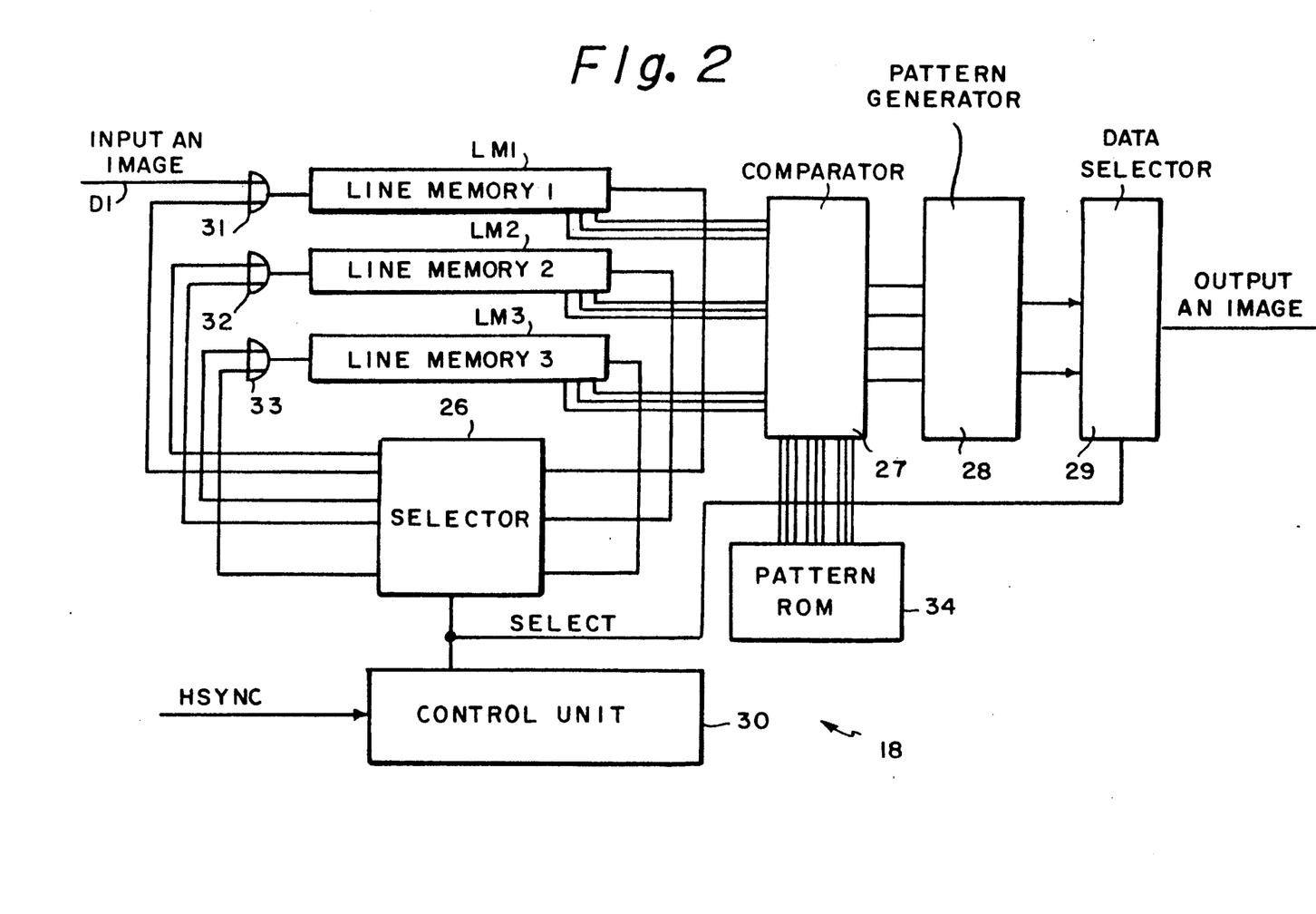
FIG. 2 is a block diagram showing a converting unit of the laser printer shown in FIG. 1.

FIG. 2 is a block diagram showing arrangement of the converting section 18 of FIG. 1.

As shown, the converting section 18 is arranged to have line memories LM1 to LM3, a selector 26, a comparator 27, a pattern generator 28, a data selector 29, and a control unit 30. The line memories LM1 to LM3 store the data input from the drawer section 17 through OR gates 31, 32, 33. The selector 26 transfers the content of the line memory LM1 to the line memory LM2 and then to the line memory LM3 in sequence. The comparator 27 compares the dot pattern output from the line memories LM1 to LM3 with a pattern pre-stored in a pattern ROM 34. The pattern generator 28 converts the pattern of 300-dpi dot data into the pattern of 600-dpi dot data on the basis of the compared result. The data selector 29 divides the dot data of the doubled line density at each line into an upper portion and a lower portion and outputs them one by one.

The control unit 30 serves to control the selector 26 and the data selector 29.

Figure 3:
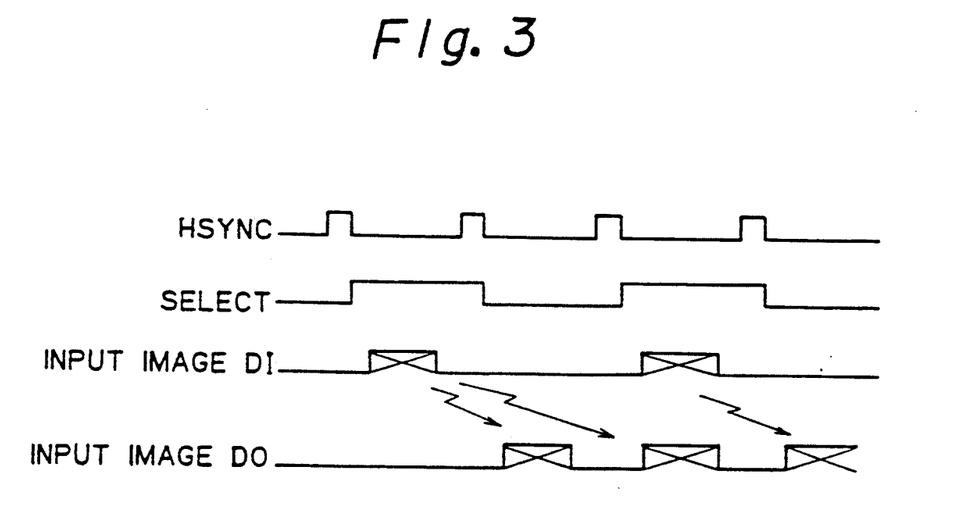
FIG. 3 is a time chart showing timing on which the converting unit shown in FIG. 2 operates.

FIG. 3 is a time chart showing the timing on which the converting section 18 operates. As shown, each time a horizontal synchronizing signal HSYNC is input to the control unit 30 twice, that is, for each of twice scan lines, a select signal is supplied from the control unit 30 to the selector 26.

It results in starting the transfer of the dot data DI to the line memory 2 and then to the line memory 3 in sequence.

Figure 4:
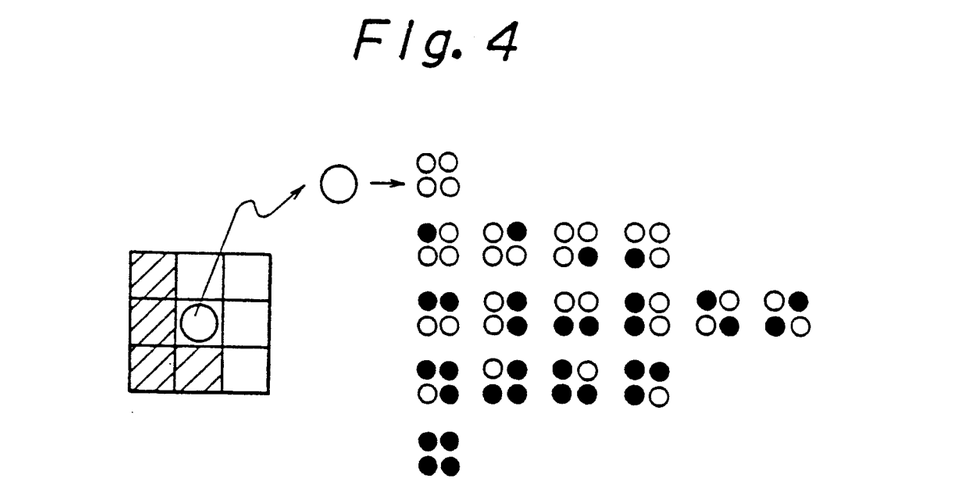
FIG. 4 is an explanatory view showing operation of pattern occurrence executed in the converting unit shown in FIG. 2.

The comparator 27 serves to read a dot pattern for an area of 3 rows×3 columns from the line memories LM1 to LM3 and compare the read dot pattern with the pattern pre-stored in the pattern ROM 34 for identifying the type of the read dot pattern. As shown in FIG. 4, the pattern generator 28 serves to one dot of a central pixel (focus pixel) into four dots according to the type of the identified pattern. The pattern generated in the pattern generator 28 is output as the data for each scan, that is, the image data for the printing density of 600 dpi through the data selector 29.

Figure 5:
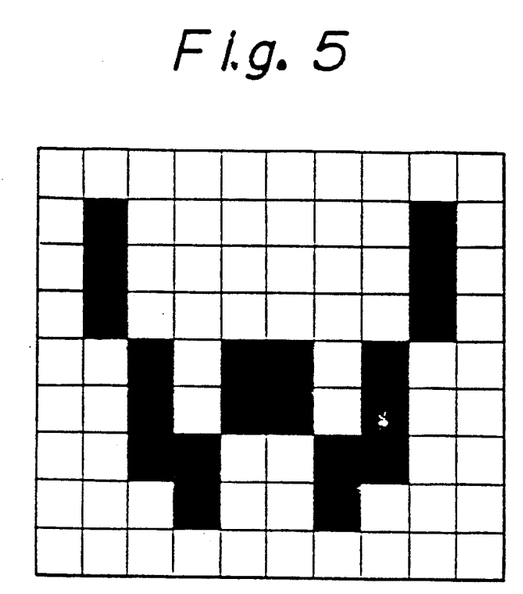
FIG. 5 is a view showing the printed results of a known printer.
Figure 6:
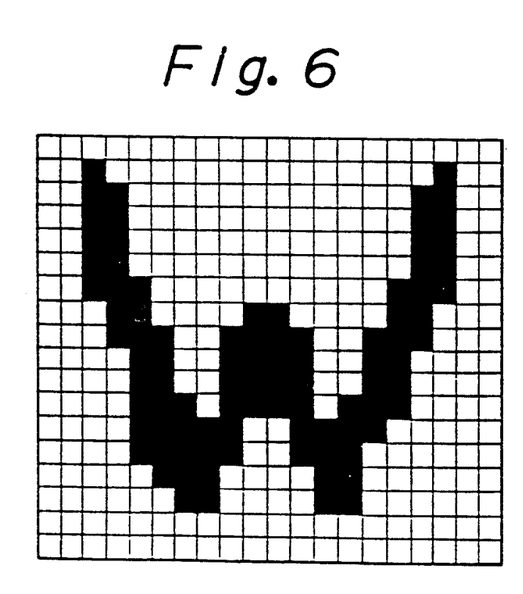
FIG. 6 is a view showing the printed results of the printer shown in FIG. 1.

FIG. 5 shows the printed result of a character "W" printed by the known printer having a printing density of 300 dpi, while FIG. 6 shows the printed result of the same character "W" printed by the printer of this embodiment, for a comparison.

In printing the character, the 300-dpi dot data is converted into the 600-dpi dot data. As is apparent from the comparison between FIGS. 5 and 6, the image quality is far more improved by converting the 300-dpi dot data into the 600-dpi dot data for printing an image.

Figure 7:
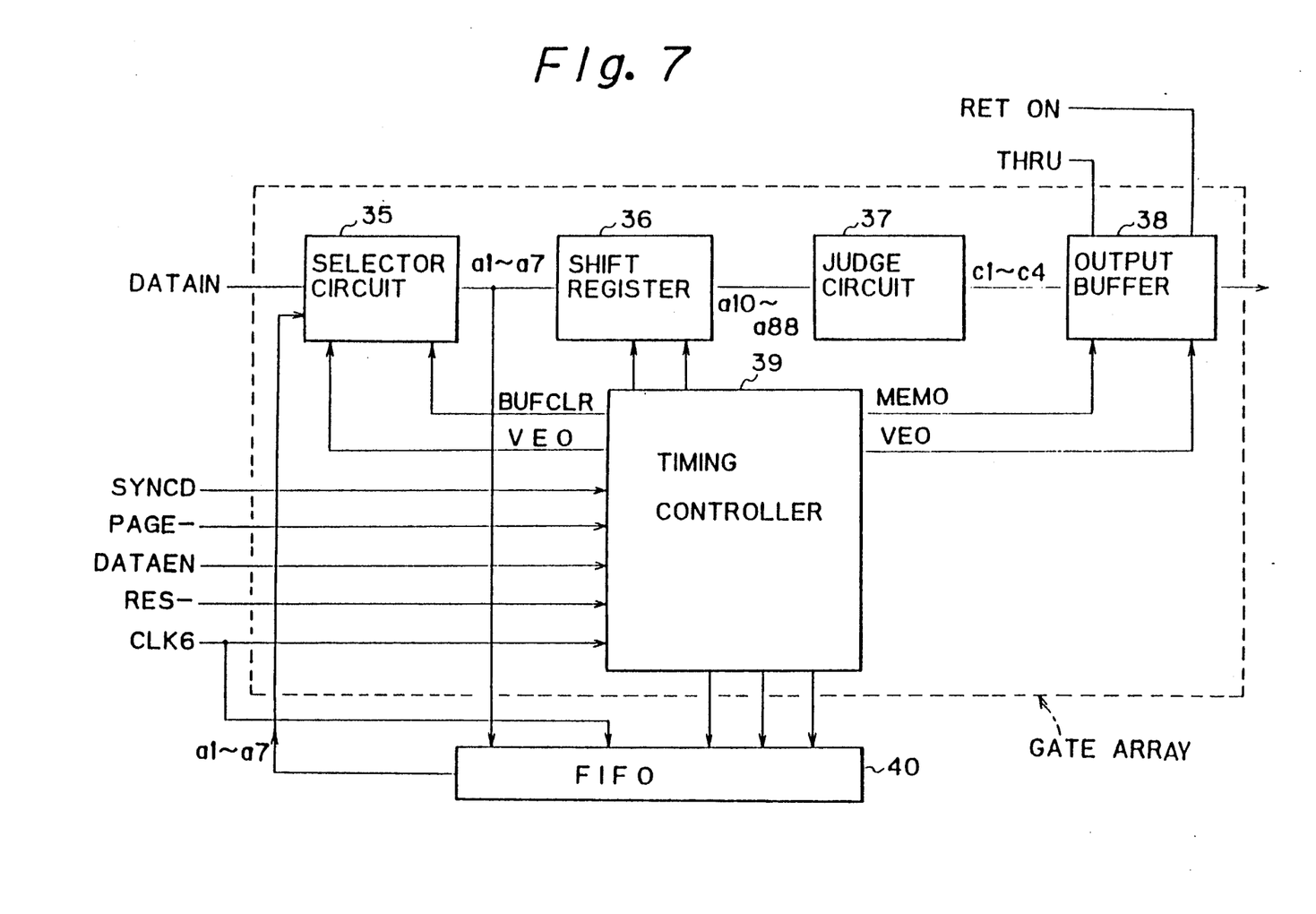
FIG. 7 is a block diagram showing a converting unit of a laser printer according to another embodiment of the present invention.

FIG. 7 is a block diagram showing an image recording apparatus according to another embodiment of the present invention.

The image recording apparatus according to this embodiment is arranged to have a selector circuit 35, a shift register 36, a judge circuit 37, an output buffer 38, a timing controller 39 and an FIFO unit 40.

Comparing with FIG. 2, the selector circuit 35 corresponds to a selector 26, the shift register 36 corresponds to the line memories LM1 to LM3, the judge circuit 37 corresponds to the pattern ROM 34, the comparator circuit 27 and the pattern generator 28, respectively. Further, the output buffer 38 corresponds to the data selector 29, and the timing controller 39 corresponds to the control unit 30.

In this apparatus, for converting a DATAIN signal of 300 dpi into 600 dpi data, two scans for 600 dpi match to one scan for 300 dpi. In scanning the even lines and the odd lines at 600 dpi, the DATAIN signal is processed as follows.

The DATAIN signal is written to the FIFO unit 40 and the shift register 36 at a time together with the other signals. Since the DATAIN signal is for 300 dpi, it is written to the FIFO unit 40 and the shift register 36 when the apparatus is scanning the odd lines. When the apparatus is scanning the even lines, the data is iteratively output from the FIFO unit 40 to the select circuit 35. Those signals are sent from the select circuit 35 to the shift register 36, the judge circuit 37 and the output buffer 38 through which the data signal is divided into a group of four dots, that is, an upper two dots and a lower two dots through the effect of a VEO signal output from the timing controller 39.

Figure 8:
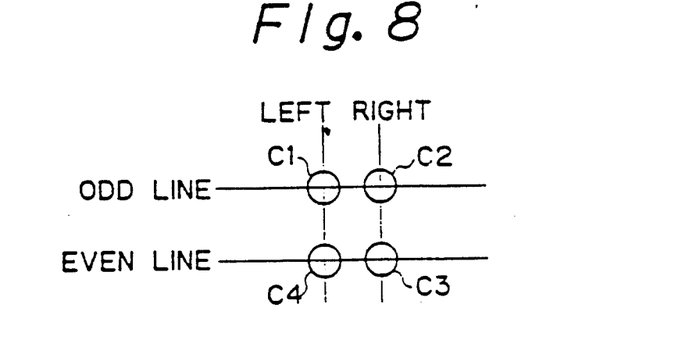
FIG. 8 is an explanatory view showing a shift register included in the converting unit shown in FIG. 6.

Tables 1 and 2 show a content stored in the shift register 36 of FIG. 6, and FIG. 8 shows a descriptive drawing for Tables 1 and 2.

TABLE 1

INPUT

| a10 a11 a12 | a13 a14 a15 | a16 a17 a18 |
| a20 a21 a22 | a23 a24 a25 | a26 a27 a28 |
| a30 a31 a32 | a33 a34 a35 | a36 a37 a38 |
| a40 a41 a42 | a43 a44 a45 | a46 a47 a48 |
| a50 a51 a52 | a53 a54 a55 | a56 a57 a58 |
| a60 a61 a62 | a63 a64 a65 | a66 a67 a68 |
| a70 a71 a72 | a73 a74 a75 | a76 a77 a78 |
|             | a83 a84 a85 | a86 a87 a88 |

OUTPUT

| c1, c2 |
| c4, c3 |

TABLE 2

| VEO | HEO | DATA |
| --- | --- | --- |
| 1 | 1 | c1 |
| 1 | 0 | c2 |
| 0 | 1 | c4 |
| 0 | 0 | c3 | where for VEO,
1 represents an odd line
0 represents an even line
for HEO,
1 represents a left-side
0 represents a right-side The center pixel a44 is output as values c1 to c4 on the basis of the peripheral pixels a10 to a88 as shown in FIG. 8. The peripheral pixels a10 to a88 are defined as the outputs c1 to c4 in the judge circuit 37.

Figure 9:
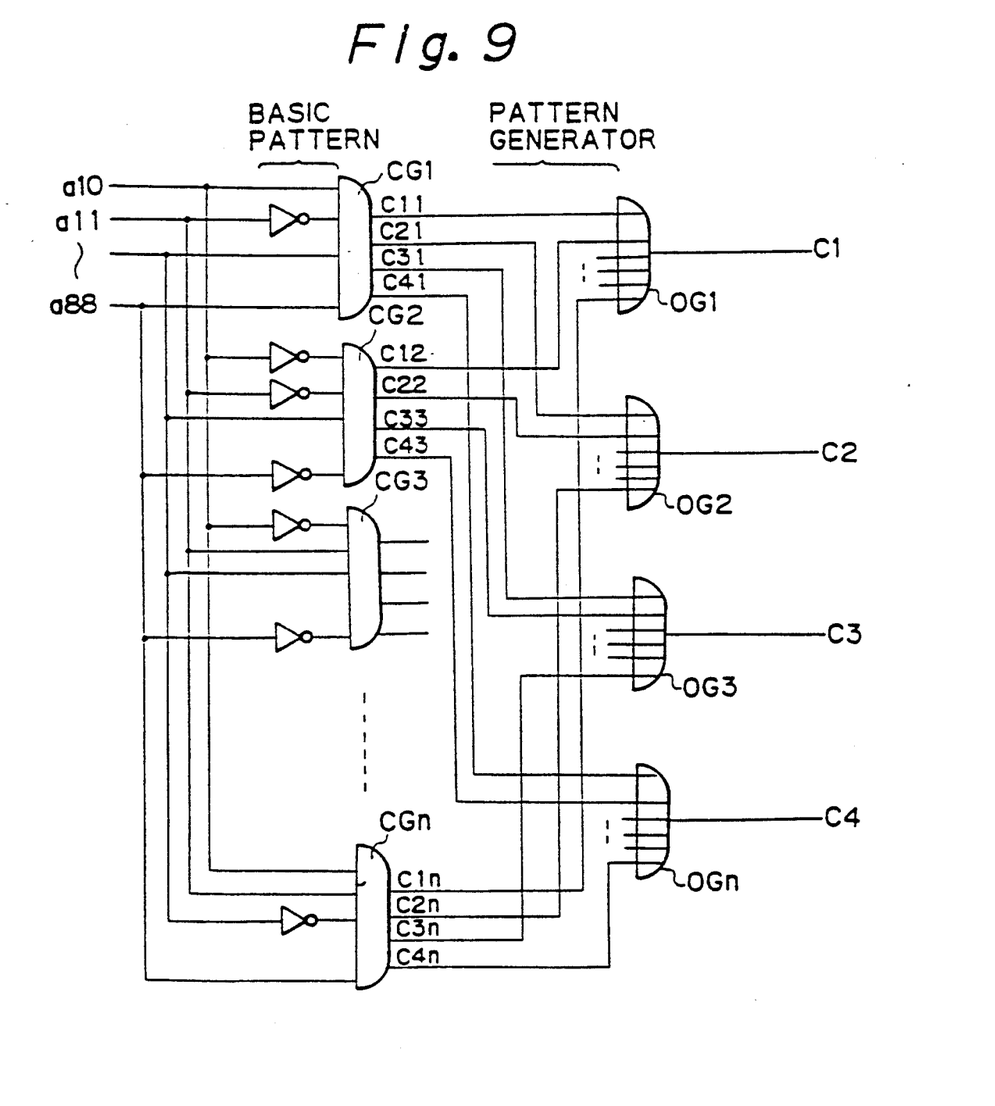
FIG. 9 is a circuit diagram showing a judge circuit included in the converting unit shown in FIG. 6.

FIG. 9 is a circuit diagram showing a block diagram of the judge circuit 37. The peripheral pixels a10 to a88 are input to a coincide gate 41. The coincide gate 41 is arranged to have a logic corresponding to an upper part of FIG. 10.

Figure 10:
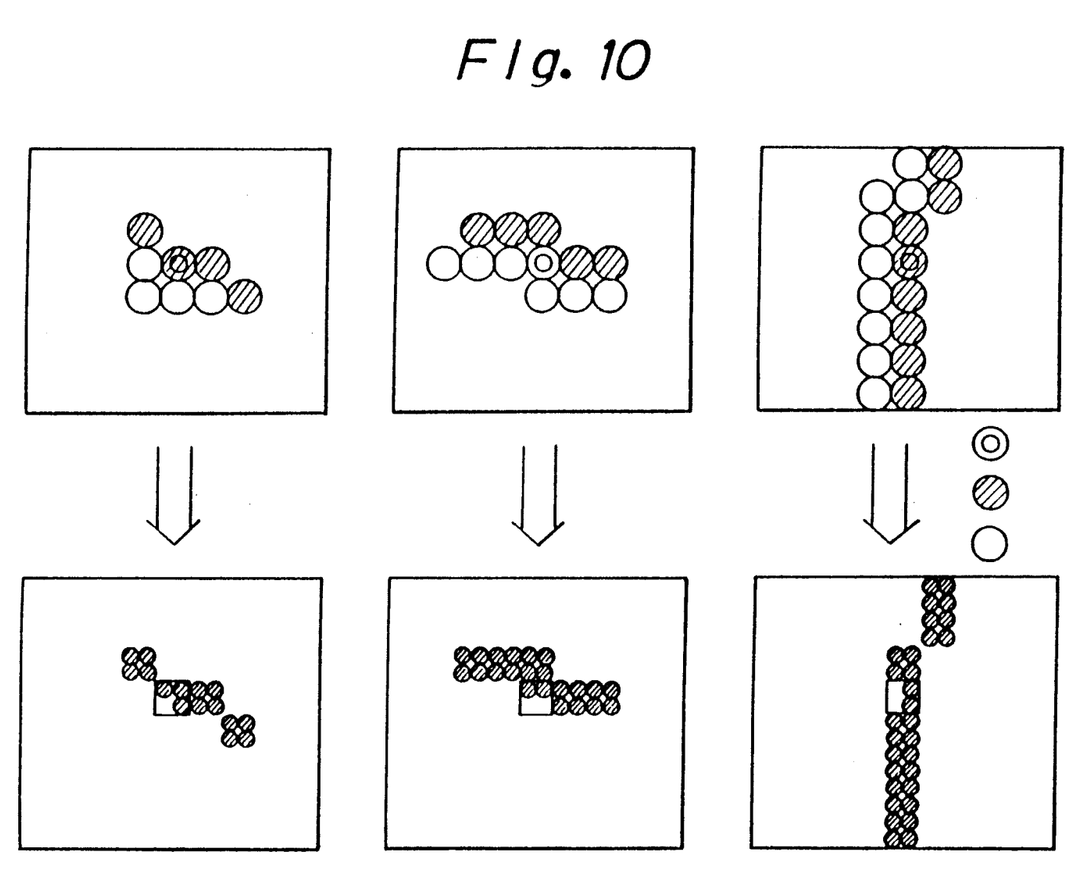
FIGS. 10 to 13 are explanatory views showing processings of dots done in the judge circuit of FIG. 9.
Figure 11:
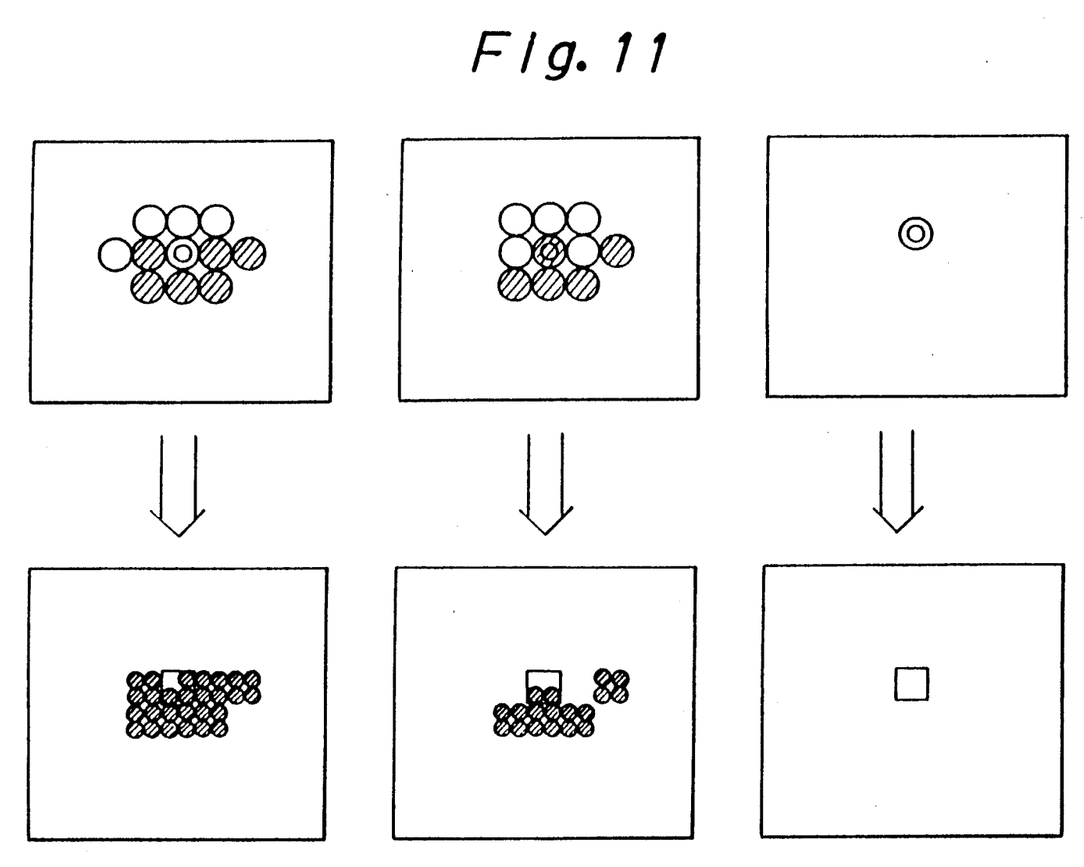
Figure 12:
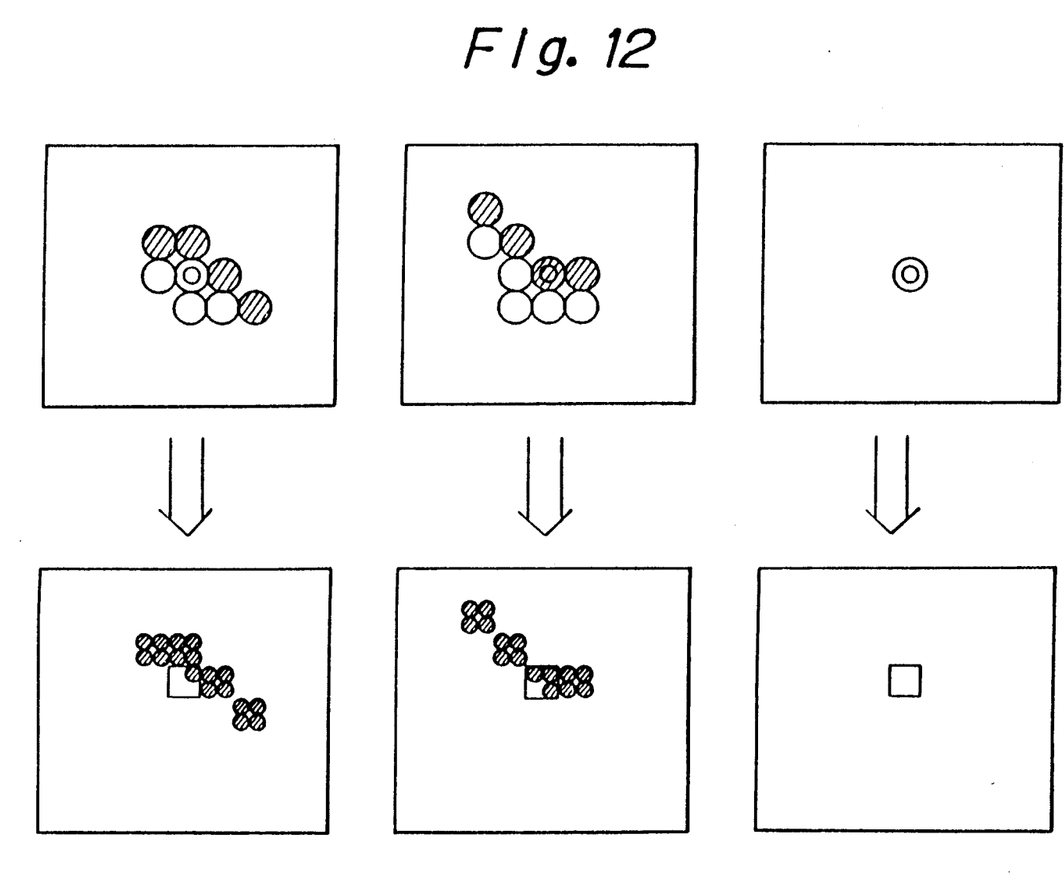
Figure 13:
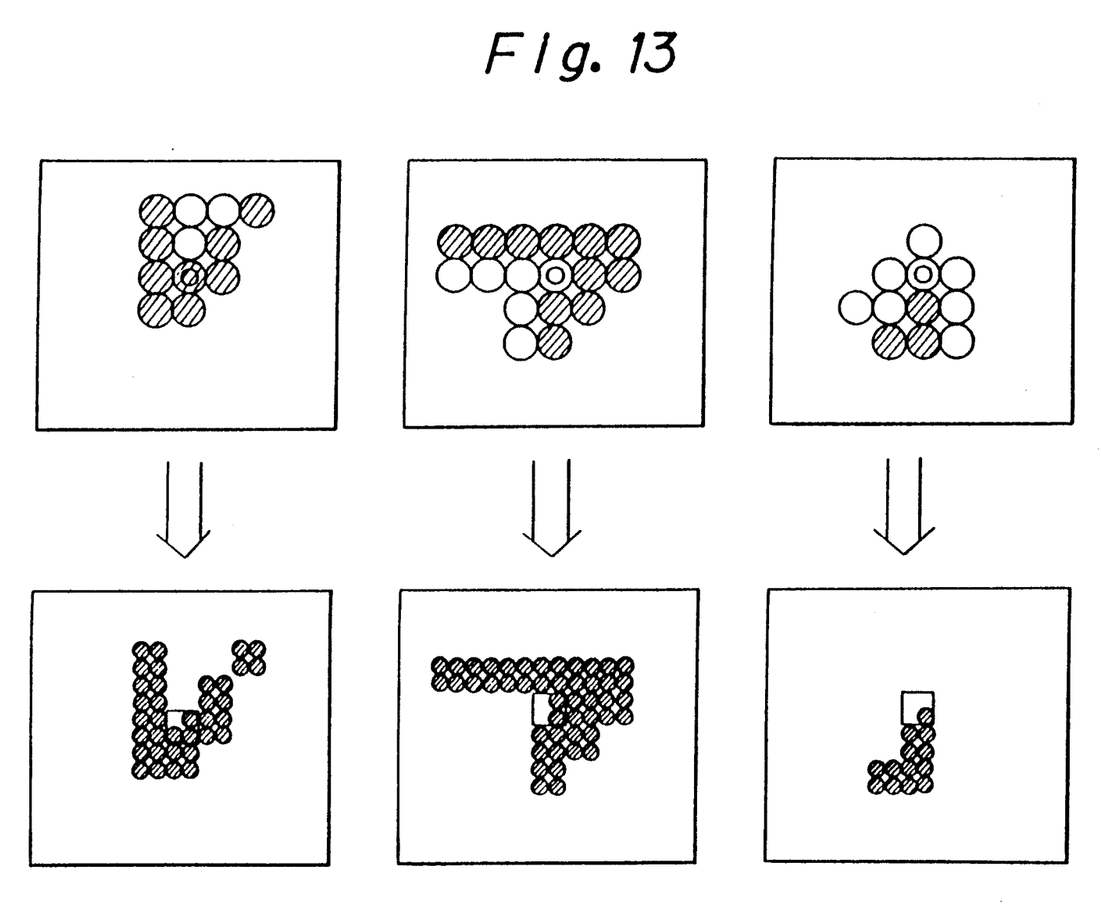

FIG. 10 shows a processing of a slash, FIG. 11 shows a processing of a specific dot, FIG. 12 shows a processing of a curve, and FIG. 13 shows a processing of a cut-away or acute portion.

For black dots, a positive logic is taken and for white dots, a negative logic (inversion) is taken. All pixels are AND-operated. Then, the predetermined patterns c11 to c41 suited to the AND-operated patterns are output. The coincidence gates CG1 to CGn coincide with the number of reference patterns. These outputs c1 to c4 are supplied as c1 through the effect of the OR gates OG1 to OG4.

FIGS. 14 to 17 show logic formula corresponding to processings of the outputs c1 to c4, which represent the judge circuit 37. In FIGS. 14 to 17, * denotes AND, / denotes an inverter and + denotes OR, respectively. FIGS. 14 to 17 correspond to processings of the outputs c1 to c4, respectively.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image recording apparatus which is capable of recording an image by forming a dot for each pixel, comprising:
   means for receiving dot data having a first dot density;
   means connected to said receiving means for converting said received data into dot data having a second dot density by replacing a dot of a focus pixel with a plurality of dots having patterns corresponding to dot patterns of areas containing said focus pixel; and
   means connected to said converting means for forming an image in accordance with said converted dot data,
   said converting means including an interpreter section for decoding said dot data having said first dot density received by said receiving means, a storage section coupled with said interpreter section for storing font data, a drawer section connected to both of said interpreter section and said storage section for generating drawing data by comparing data output from said interpreter section with said font data stored in said storage section, and a converting section for converting the data output from said drawer section into dot data having said second dot density,
   said forming means including an optical system having a photosensitive drum for forming a latent image corresponding to the data output from said converting means on said photosensitive drum by scanning.

2. An image recording apparatus according to claim 1, wherein said receiving means is adapted to be connected to a host computer for receiving said dot data having said first dot density.

3. An image recording apparatus according to claim 2, wherein said receiving means is capable of receiving code data which is output from said host computer.

4. An image recording apparatus according to claim 2, wherein said first dot density of said dot data is 300 dpi.

5. An image recording apparatus according to claim 1, wherein said second dot density is 600 dpi.

6. An image recording apparatus according to claim 1, wherein converting section includes a plurality of line memories for storing data output from said draw section.

7. An image recording apparatus according to claim 6, wherein said converting section further includes a plurality of logic gates connected to said plurality of line memories, each of said logic gates being adapted to pass through said data output from said draw section.

8. An image recording apparatus according to claim 6, wherein said converting section further includes a selector connected to both of said plurality of logic gates and said plurality of line memories for transferring a content of one of said plurality of line memories to another one of said plurality of line memories sequentially.

9. An image recording apparatus according to claim 8, wherein said converting section further includes a pattern storage section for pre-storing a pattern, and a comparator connected to said plurality of line memories and said pattern storage section for comparing said dot pattern output from said plurality of line memories with said pattern pre-stored in said pattern storage section.

10. An image recording apparatus according to claim 9, wherein said converting section further includes a pattern generator connected to said comparator for converting the pattern of 300-dpi dot data into the pattern of 600-dpi dot data in accordance with a compared result by said comparator.

11. An image recording apparatus according to claim 10, wherein said converting section further includes a data selector connected to said pattern generator for dividing dot data of doubled line density at each line into an upper portion and a lower portion and outputs said dot data one by one.

12. An image recording apparatus according to claim 11, wherein said converting section further includes a control unit connected to both of said selector and said data selector for controlling said selector and said data selector.

13. An image recording apparatus according to claim 1, wherein said forming means further includes a process system having a developing unit for fixing toner on the latent image for visualizing the latent image and a cleaning unit for removing residual toner.

14. An image recording apparatus according to claim 13, wherein said forming means further includes a fixing system for fixing toner on a recording sheet, and a sheet feeding system for feeding said recording sheet.

15. An image recording apparatus according to claim 1, wherein converting section includes a shift register for storing data output from said draw section.

16. An image recording apparatus according to claim 15, wherein said converting section further includes a selector circuit connected to said shift register for selecting a data to be transferred to said shift register.

17. An image recording apparatus according to claim 16, wherein said converting section further includes a judge circuit connected to said shift register for pre-storing a pattern, for comparing said dot pattern output from said shift register with said pattern pre-stored therein, and for converting the pattern of 300-dpi dot data into the pattern of 600-dpi dot data in accordance with a compared result.

18. An image recording apparatus according to claim 17, wherein said converting section further includes an output buffer connected to said judge circuit for dividing dot data of doubled line density at each line into an upper portion and a lower portion and outputs said dot data one by one.

19. An image recording apparatus according to claim 18, wherein said converting section further includes a timing controller connected to both of said shift register and said output buffer for controlling said shift register and said output buffer so as to output a proper data.

20. An image recording apparatus according to claim 18, wherein said converting section further includes a FIFO unit connected to said timing controller for storing data output from said timing controller.

* * * * *